United States Patent [19]

Pentney et al.

[11] 4,422,478
[45] Dec. 27, 1983

[54] CLOSURE DEVICE

[75] Inventors: Harry Pentney, Highworth; Anthony R. L. Fitch, Swindon, both of United Kingdom

[73] Assignee: Raychem Limited, London, England

[21] Appl. No.: 233,119

[22] Filed: Feb. 10, 1981

[30] Foreign Application Priority Data

Feb. 23, 1980 [GB] United Kingdom ............... 8006212
Nov. 10, 1980 [GB] United Kingdom ............... 8036170

[51] Int. Cl.³ .......................................... F16L 11/12
[52] U.S. Cl. .................................. 138/168; 138/128; 138/156; 138/166; 138/167; 138/DIG. 1; 174/68 C; 174/DIG. 8; 174/DIG. 11
[58] Field of Search ............... 138/128, 156, 163, 166, 138/167, 168, 135, 129, 154, DIG. 1; 174/68 C, DIG. 8, DIG. 11

[56] References Cited

U.S. PATENT DOCUMENTS

| | | |
|---|---|---|
| 2,756,172 | 7/1956 | Kidd . |
| 2,960,561 | 11/1960 | Plummer ............... 138/168 X |
| 3,038,205 | 6/1962 | Plummer ............... 174/DIG. 11 |
| 3,099,216 | 7/1963 | Jakobsen et al. ....... 138/168 X |
| 3,379,218 | 4/1968 | Conde .................. 174/DIG. 8 |
| 3,451,609 | 6/1969 | Gillett .................... 228/56 R |
| 3,542,077 | 11/1970 | Muchmore . |
| 3,568,308 | 3/1971 | Plaskon ............... 174/DIG. 8 |
| 3,654,049 | 4/1972 | Ausnit ............... 174/DIG. 11 X |
| 3,816,335 | 6/1974 | Evans ................ 174/DIG. 8 X |
| 3,846,575 | 11/1974 | Troy .................. 138/168 X |
| 4,181,775 | 1/1980 | Corke ................ 174/DIG. 8 X |
| 4,224,965 | 9/1980 | Suchor ............... 138/129 X |
| 4,298,415 | 11/1981 | Holf .................. 174/DIG. 8 X |

FOREIGN PATENT DOCUMENTS

| | | |
|---|---|---|
| 2004748 | 8/1971 | Fed. Rep. of Germany . |
| 1137618 | 5/1957 | France . |
| 2009087 | 1/1970 | France . |
| 2330176 | 5/1977 | France . |
| 2370225 | 6/1978 | France . |
| 692636 | 6/1953 | United Kingdom . |
| 738913 | 10/1955 | United Kingdom . |
| 899875 | 6/1962 | United Kingdom . |
| 935885 | 9/1963 | United Kingdom . |
| 1297725 | 11/1972 | United Kingdom . |
| 1485175 | 9/1977 | United Kingdom . |
| 1532611 | 11/1978 | United Kingdom . |
| 1594573 | 7/1981 | United Kingdom . |

Primary Examiner—James E. Bryant, III
Attorney, Agent, or Firm—Edith A. Rice; Herbert Burkard

[57] ABSTRACT

A wrap-around device for enclosing an elongate object comprises a cover having two opposed edge portions and that can be interlocked to retain them together. At least one of the edge portions, and preferably both the edge portions, are provided with a protuberance which extend along the edge portions and engage the opposed edge portion that may be caused if the edge portions are subjected to a tensile force tending to separate them, for example as may be caused if the device and enclosed object is bent.

Preferably at least one of the edge portions is provided with a layer of adhesive to prevent moisture ingress between the edge portions.

10 Claims, 4 Drawing Figures

CLOSURE DEVICE

This invention relates to closure devices for elongate objects, especially for objects such as electrical cables, wires bundles and the like.

In order to protect electrical wires from mechanical or chemical damage, it is customary to enclose them in an outer jacket or sheath. In many instances, for example in the manufacture of large, complex electronic equipment such as computers, or in the installation of electrical wiring in buildings, along railway lines and the like, it is the practice to lay the wires in the form of bundles in the desired spatial layout and then to enclose the wires in the outer jacket or a flexible conduit.

Since it is desirable for the jackets or conduits to be available in continuous lengths, they are usually formed from plastics materials by extrusion processes. Normally the jacket or conduit is in the form of a cover of open cross-section, for example a sheet which can be positioned about the bundle, the cover having two opposite edge portions extending along its length which can be engaged to enclose the bundle in the cover by a mechanical closure arrangement.

However, because the wire bundles are often laid in very confined spaces, it is desirable for the cover to add as little bulk to the bundle as possible. In addition, it is necessary for the cover to be capable of being bent around relatively tight curves when installed in order to follow the layout of the wires. This can put considerable strain on the closure arrangement, and previously proposed closure devices have suffered from the disadvantage that forces occurring in the installed devices when the wire bundle is bent tend to force the edge portions of the cover apart and expose the wire bundle.

According to one aspect, the present invention provides a closure device for enclosing at least part of an elongate object such as a wire bundle, which comprises a cover of open cross-section adapted to be positioned about the object, the cover having two opposite edge portions that can be interlocked to retain the cover about the object, one edge portion having a ridge extending parallel to the edge which, when the edge portions are interlocked, engages a corresponding ridge or recess of the opposite edge portion to retain the edge portions together against a tensile force tending to separate them, and at least one edge portion having a protuberance extending along the edge portion which, when the edge portions are interlocked, engages the other edge portion to counteract any turning moment on the other edge portion due to the said tensile force.

Preferably each edge portion has a protuberance extending along it which can engage the other edge portion, the two protuberances together bearing on the opposite edge portions to counteract the turning moment or couple that acts on the closure portions due to the tensile force. The turning moment or couple is due to the fact that the ridges or ridge and recess that retain the edge portions together have a finite height so that, whilst the tensile force will act on the ridge or recess at its base, the corresponding reaction to this force by the opposite closure portion will act over the entire height of the ridge or depth of the recess. Since the closure device needs to be flexible, the edge portions will be susceptible to deformation due to the couple, which could cause them to slip out of engagement. The device according to the invention has the advantage that it is possible to form closure devices, for example in the form of conduits from plastics materials, in which the size of the interlocking closure arrangement may be considerably reduced without it "splitting" open when subjected to a force tending to separate the edge portions such as may occur when the wire bundle and closure device is forced round a tight bend.

The edge portions are preferably arranged so that the turning moment or couple is substantially completely counteracted by the protuberance or protuberances. Preferably also, the protuberance acts on the other edge portion at a distance from the point of engagement of the edge portions that is greater than the height of the other edge portion. Where the edge portions are engagable by means of ridges or a ridge and recess, the protuberance of one edge portion acts on the other edge portion at a distance from the ridges or ridge and recess that is greater than the ridge height, preferably at least twice and especially at least three times the ridge height. Since a turning moment is equal to the product of the force and the distance between the force and the fulcrum, the greater the distance between the ridge or recess and the point at which the protuberance bears on the other edge portion, the less the force the protuberance need exert on the other edge portion to counteract the couple. The closure portions are advantageously substantially flat in order to reduce the bulk of the closure device and to increase its flexibilty.

The or at least one of the protuberances is preferably in the form of a flap or flange that lies substantially parallel to the surface of the cover in the region of the edge portions in order to reduce the height of the closure arrangement. For example, where one edge portion is arranged to overlie the other edge portion, the overlying edge portion may extend beyond its ridge or recess and the underlying edge portion may be provided with a protuberance on its outer surface that extends over the end of the overlying edge portion. Alternatively, the underlying edge portion may have a protuberance on its outer surface that extends away from the edge, and the overlying edge portion may extend over the protuberance of the underlying edge portion and curl round the end of the protuberance so that the end of the overlying edge portion is retained by the under surface of the protuberance. Corresponding protuberances may be provided on the under surface of the overlying edge portion or the underlying edge portion may simply extend under the overlying edge portion for a distance beyond the ridges or ridge and recess. The edge portions may be provided with one or more additional ridges and/or recesses to help take the load of the tensile force.

The closure device according to the invention may conveniently be formed by extruding a polymeric material in the desired configuration, either with an open cross-section or in the form of a tube which is then slit open. Whilst it is possible for the edge portions to be formed separately from the rest of the cover and joined to the cover for example by welding there will usually be no advantage in this process.

In a preferred embodiment of the invention, the cover is dimensionally-recoverable. Dimensionally recoverable articles are articles, the dimensional configuration of which may be made substantially to change when subjected to the appropriate treatment. Preferably the cover is dimensionally heat-recoverable. Heat-recoverable articles may be produced by deforming a dimensionally heat-stable configuration to a dimensionally heat-unstable configuration, in which case the article will assume, or tend to assume, the original heat-stable configuration on the application of heat alone.

According to one method of producing a heat-recoverable article, a polymeric material is first extruded or moulded into a desired shape. The polymeric material is then cross-linked or given the properties of a cross-linked material by means of chemical cross-linking initiators or by exposure to high energy radiation, for example a high energy electron beam or gamma radiation. The cross-linked polymeric material is heated and deformed and then locked in the deformed condition by quenching or other suitable cooling methods. The deformed material will retain its shape almost indefinitely until exposed to a temperature above its crystalline melting temperature, for example about 115° C. in the case of polyethylene. Examples of heat-recoverable articles may be found in U.S. Pat. No. 2,027,962 and U.K. Patent Specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, whilst hot, to a dimensionally heat unstable form.

Any polymeric material to which the property of dimensional recoverability may be imparted, may be used to form the device. Preferably the device comprises a polymeric material to which the property of dimensional recoverability has been imparted by cross-linking and deforming the material. Polymers which may be used to form the polymeric material include polyolefins such as polyethylene and ethylene copolymers for example with propylene, butene, vinyl acetate or ethyl acrylate, polyamides, polyurethanes, polyvinylchloride, polyvinylidene fluoride, elastomeric materials such as those described in U.K. Specification No. 1,010,064 and blends such as those disclosed in U.K. Specification Nos. 1,284,082 and 1,294,665, the disclosures of which are incorporated herein by reference. Preferably the heat-recoverable region is formed from a polyolefin or a blend of polyolefins, and especially it comprises polyethylene. While it is possible for the remaining parts of the edge portions to be formed from different materials, it is clearly preferable for the entire cover to be formed from the same polymeric material. The polymeric material may additionally contain other components for example fillers, plasticisers, pigments, stabilisers, anti-oxidants and lubricants. Preferably the material includes a flame retardant or flame retardant system for example a brominated phenyl ether and antimony pentoxide or a flame retardant system as described in U.K. Patent Applications No. 2035333 the disclosure of which is incorporated herein by reference.

If it is desired to protect the enclosed object from ingress of moisture, it may be advantageous to coat the surface of one or each edge portion that contacts the other edge portion with a layer of adhesive, preferably pressure-sensitive or contact adhesive, or a hot melt adhesive. Preferably the surface of the or each edge portion located between the ridges (or ridge and recess) and one or the protuberances is coated with the adhesive. Preferably a pressure-sensitive on contact adhesive is used. As the pressure-sensitive adhesive, there may be mentioned rubber based acrylics or thermoplastics, styrene-butadiene or styrene-isoprene block copolymers that contain tackifiers, for example hydrocarbon tackifiers, silicones and adhesives based on ethylene-vinyl acetate, preferably styrene-butadiene block copolymers. The adhesives may be applied onto the cover from solution or from the melt, in known manner. If a contact adhesive is used, one based on chloroprene is preferred. If a hot melt adhesive is used, it is advantageous for at least one of the edge protions to be provided with a temperature indicator, preferably a thermochromic material, arrange to indicate when the hot-melt adhesive has received sufficient heat to melt or soften it.

In a preferred device, one edge portion is provided with a reservoir of hot-melt adhesive located in a dimensionally-recoverable portion thereof so that, when the edge portions have been interlocked are heated, the adhesive will melt or soften and recovery of the dimensionally-recoverable region will cause the adhesive to flow between the edge portions. Thus, according to another aspect, the invention provides a closure device for enclosing at least part of an elongate object, which comprises a cover of open cross-section adapted to be positioned about the object so that a first portion adjacent to one edge overlies a second portion adjacent to an opposite edge, means for retaining the said portions at least temporarily in overlying relationship, and a reservoir of hot-melt adhesive located in a dimensionally recoverable region of one of the portions so that, when the cover has been positioned about an object and the overlying portion is heated, the adhesive will melt or soften and recovery of the dimensionally recoverable region will cause the adhesive to flow between the two portions.

The dimensionally recoverable portion may comprise a region of elastomeric material that has been deformed, for example to form a recess, so that it can accommodate the hot-melt adhesive, and is held in its deformed configuration by the rigidity of the adhesive. On heating the overlying region, the adhesive softens and can no longer hold out the elastomeric material, whereupon the recess recovers to its original configuration which is preferably substantially flat, and causes the adhesive to flow between the two portions. Preferably, the dimensionally-recoverable portion is dimensionally heat-recoverable.

The quantity of hot-melt adhesive present in the reservoir is preferably sufficient to occupy at least a major part of, and especially substantially all, the space between the overlying portions of the cover after it has been caused to flow between the portions.

If the edge portions are formed from a plastics material, they will usually be sufficiently resiliently deformable for the edge portions to be interlocked with ease. The edge portions closure device according to the invention, are particularly suitable to being joined by means of a slide in a manner similar to a zip fastener, and accordingly the invention also provides a combination comprising a closure device as described above and a slide having two channels each of which is capable of receiving one edge portion of the closure device to allow the slide to move along the edge portion, the channels being arranged so that when each channel has received an edge portion and the slide is moved along the edge portions, the edge portions will be brought into interlocking engagement.

Two forms of closure device in accordance with the invention will now be described by way of example with reference to the accompanying drawings in which.

Figure 1:
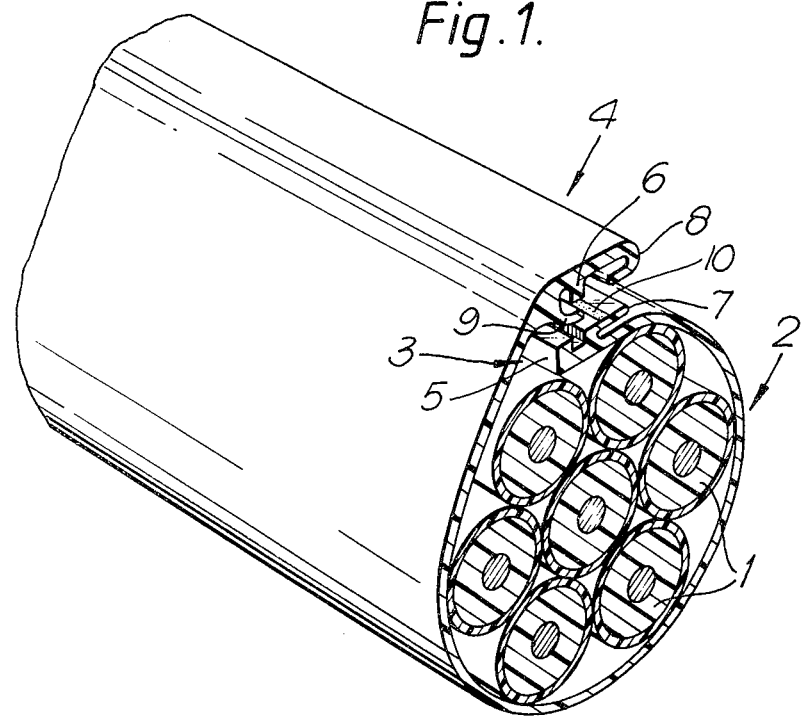
FIG. 1 is a sectional view of part of a wire bundle and a closure device according to the invention.
Figure 2:
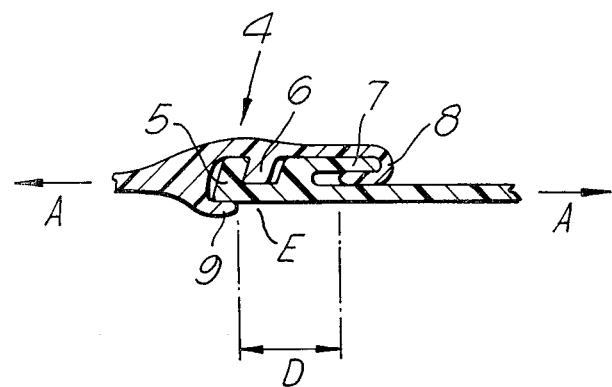
FIG. 2 is a section through the edge portions of the device shown in FIG. 1.

Referring to FIGS. 1 and 2 of the accompanying drawings, a bundle of wires 1 is enclosed by means of a heat-shrinkable cover 2 having two edge portions generally indicated at 3 and 4 which can be interlocked as shown in FIG. 2 to retain the cover about the bundle. The underlying edge portion 3 has a ridge 5 extending along the edge thereof, and the opposite edge portion 4 has a corresponding ridge 6 extending along its underside. The edge portion 3 is also provided with a longitudinally extending protuberance 7 in the form of a flap that is substantially parallel to the surface of the cover in the region of the edge portion and is directed away from the ridge 5. The closure portion 4 extends beyond the ridge 6 and terminates in a "C" shaped flap 8.

When the edge portions 3 and 4 are brought into engagement, as shown in FIG. 2, and a tensile force, for example due to bending of the closure device or recovery of the cover is applied to the edge portions 3 and 4 in the direction of the arrows "A", the ridges 5 and 6 will engage each other to prevent the closure portions opening.

The turning moment or couple that acts on the edge portions 3 and 4 and would tend to cause the edge portions to open due to the deformability of the plastics material, is counteracted by engagement of the flap 8 and protuberance 7. As can be seen from FIG. 2, the distance "D" between the effective part of the protuberance 7 and the ridge 5 is substantially greater than the height of the ridges 5 and 6 so that the forces experienced by the flap 8 and protuberance 7 are much less than the tensile forces on the edge portion.

A further protuberance 9 is provided on the overlying edge portion 4 which abuts the under surface of the ridge 5 in order to prevent the couple acting on the ridge 5 from bending it in an anticlockwise direction, as viewed in FIG. 2, about the point E. Optionally a layer of pressure-sensitive adhesive 10 is provided on the upper surface of the protuberance 7 or the corresponding surface of the edge portion 4, or a layer of contact adhesive may be provided on both surfaces.

Figure 3:
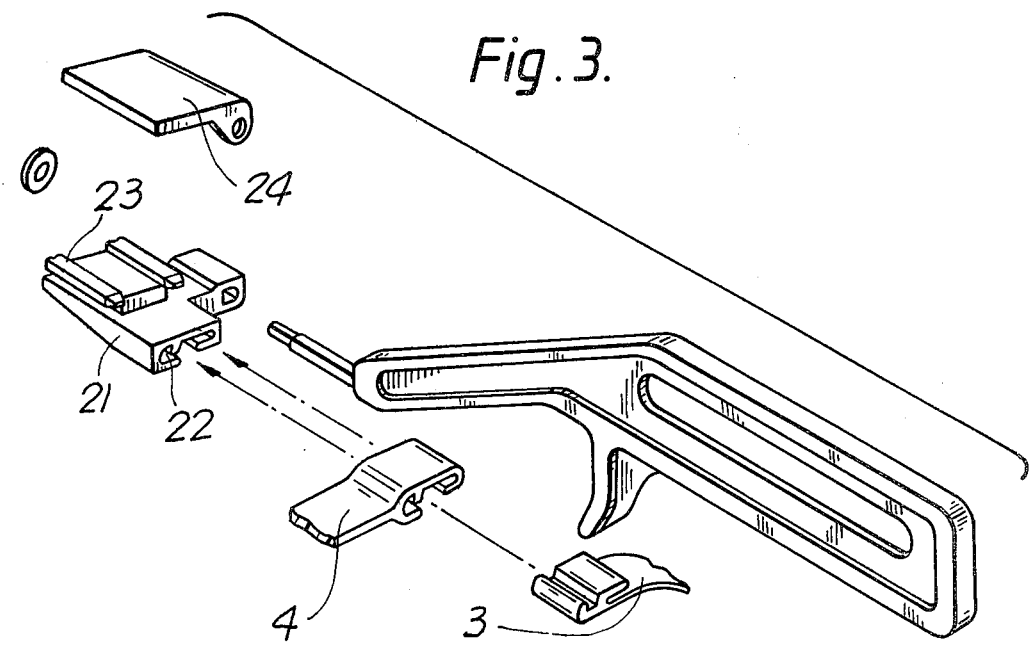
FIG. 3 is an exploded perspective view of part of the closure device and a slide device for joining the edge portions thereof together.

FIG. 3 shows an exploded view of a device for joining the edge portions together, which comprises a slide 21, having a channel 22 for receiving the edge portion 3 and a guide element 23 for receiving the edge portion 4. The slide has a cover 24 which, together with the guide element 23, forces the edge portion 4 against the edge portion 3 as the slide is moved along the edge portions. By pulling the slide along the edge portions a long length of the closure device can be closed about the wire bundle quickly and with very little effort.

Figure 4:
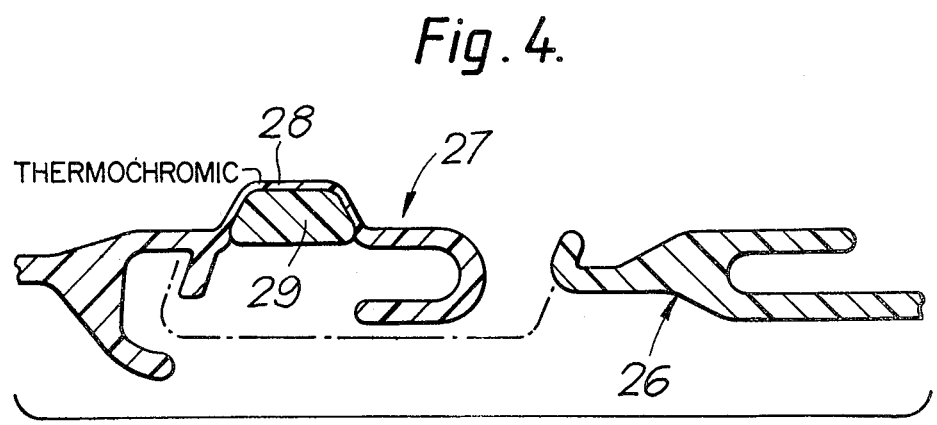
FIG. 4 is a section through the edge portions of a second form of device.

FIG. 4 shows the edge 26 and 27 portions of a further device before they have been positioned in overlying relationship. The closure mechanism is similar to that shown in FIGS. 1 and 2. The edge portion 27 which is intended to overlie the edge portion 26 has a dimensionally heat-recoverable region 28 that provides a reservoir for a hot-melt asdhesive 29. The dimensionally heat-recoverable region 28 is formed from a cross-linked polymeric material which has been deformed, when hot, from an initial, substantially flat configuration to the configuration as shown by insertion of the hot-melt adhesive 29. When the edge portions have bewen brought into engagement they may be heated, for example by means of a hot-air gun, so that the hot-melt adhesive 29 melts and the heat-recoverable region recovers to its initial, substantially flat configuration thereby causing the hot-melt adhesive to flow between the edge portions and provide a seal against moisture ingress.

It will be appreciated that it is desireable to have the temperature indicator arranged so as to indicate when the hot-melt adhesive has received sufficient heat to melt or soften it. In that regard, a thermochromic material which turns colors when the adhesive reaches its melting or softening point is applied to edge portion 4 as shown in FIG. 4.

I claim:

1. A wraparound device, comprising:
    a cover having an underlying edge and an overlying edge, the edges being opposed, the underlying edge having a first edge portion and the overlying edge having a second edge portion, the edge portions being interlocked;
    the first edge portion having a first ridge and said second edge portion having an opposed second ridge for engagement of the edge portions, the first and second ridge having a height which is approximately equal to one another;
    the first edge portion having a protuberance extending along the first edge portion and spaced from the first ridge a distance greater than the width of the second ridge the protuberance defining a flange extending longitudinally along the first edge portion and in a direction away from the second edge portion and substantially parallel to the cover defining a width, the width of the flange being at least twice the height of the ridges;
    the second edge portion having a longitudinally extending portion defining a flap and a further proterberance which abuts and underlines only the first ridge longitudinally along the first edge portion, the flap has a terminus defining a curved rim for gripping the flange;
    upon engagement of the edges, the flap overlies the flange with the curved rim gripping the underside of the flange at a distance from the first ridge at least twice the height of the ridges; and
    thereby, upon application of a tensile force tending to open the cover after engagement, the ridges absorb the majority of such a force, thereby reducing the opening force experienced by the flap against the flange and reducing the likelihood of the cover opening after engagement.

2. A device as claimed in claim 1, wherein a part of the edge portion that contacts the other edge portion is provided with a layer of adhesive.

3. A device as claimed in claim 2, wherein the adhesive is a pressure-sensitive, contact or hot-melt adhesive.

4. A device as claimed in claim 3, wherein the adhesive is a hot-melt adhesive and at least one edge portion is provided with a temperature indicator arranged to indicate when the hot-melt adhesive has received sufficient heat to melt or soften it.

5. A device as claimed in claim 4, wherein the temperature indicator is a thermochromic material.

6. A device as claimed in claim 2, wherein one edge portion is provided with a reservoir of hot-melt adhesive located in a dimensionally-recoverable portion thereof, so that, when the edge portions have been interlocked and are heated, the adhesive will melt or soften and recovery of the dimensionally-recoverable region will cause the adhesive to flow between the edge portions.

7. A device as claimed in claim 6, wherein at least one edge portion is provided with a thermochromic material arranged to indicate when the hot-melt adhesive has received sufficient heat to melt or soften it.

8. A device as claimed in claim 1, wherein the cover is dimensionally-recoverable.

9. A device as claimed in claim 5, wherein the cover is dimensionally-recoverable.

10. A device as claimed in claim 1 which includes a slide member, the slide member having two channels, one of which is slidably located on one of the edge portions and the other channel of which is capable of receiving the other edge portion so that the slide can be moved along the edge portions, the channels being arranged so that when the other channel has received the other edge portion and the slide is moved along the edge portions, the edge portions will be brought into interlocking engagement.

* * * * *